United States Patent [19]

Liebermann

[11] Patent Number: 5,189,948
[45] Date of Patent: Mar. 2, 1993

[54] LOW TEMPERATURE SPIRAL CONDUCTION VAPOR COOKER AND PROCESS

[75] Inventor: Benno E. Liebermann, Louisville, Ky.

[73] Assignee: Beltec International, Louisville, Ky.

[21] Appl. No.: 650,809

[22] Filed: Feb. 5, 1991

[51] Int. Cl.[5] ............................................. A47J 27/00
[52] U.S. Cl. .................................. 99/443 C; 99/404; 134/131; 134/132
[58] Field of Search .................. 99/345, 365, 404, 427, 99/443 C; 134/108, 131, 132; 198/778

[56] References Cited

U.S. PATENT DOCUMENTS

| 3,678,244 | 7/1972 | Worline | 99/443 C |
|---|---|---|---|
| 3,736,860 | 6/1973 | Vischer, Jr. | 99/339 |
| 3,834,408 | 9/1974 | Thalacker | 134/132 |
| 4,047,476 | 9/1977 | Liebermann | 99/325 |
| 4,134,998 | 1/1979 | Liebermann | 426/438 |
| 4,167,585 | 9/1979 | Caridis et al. | 426/233 |
| 4,224,862 | 9/1980 | Liebermann | 99/331 |
| 4,363,263 | 12/1982 | Williams | 99/352 |
| 4,455,924 | 6/1984 | Wenzel | 99/333 |
| 4,460,822 | 7/1984 | Alden et al. | 219/401 |
| 4,582,047 | 4/1986 | Williams | 126/369 |
| 4,737,373 | 4/1988 | Forney | 426/510 |
| 4,934,259 | 6/1990 | Watanabe | 99/339 |
| 4,949,629 | 8/1990 | Leary et al. | 99/386 |
| 4,966,072 | 10/1990 | Ellis-Brown | 99/443 C |

FOREIGN PATENT DOCUMENTS

| 2121577 | 11/1971 | Fed. Rep. of Germany | 99/443 C |
|---|---|---|---|
| 2633527 | 1/1990 | France | 99/443 C |
| 1119675 | 2/1976 | Japan . | |
| 1059933 | 8/1981 | Japan . | |
| 8706445 | 11/1987 | World Int. Prop. O. | 99/345 |

Primary Examiner—Harvey C. Hornsby
Assistant Examiner—Mark Spisich
Attorney, Agent, or Firm—Wallenstein, Wagner & Hattis, Ltd.

[57] ABSTRACT

A unique spiral vapor cooker and cooking process comprises an insulated housing defining cooking chamber including a reservoir of heated water therein. Rising within the cooking chamber is a vertically oriented spiral conveyor carrying a stainless steel mesh conveyor belt. Water vapor rises through the mesh conveyor belt from a downwardly flowing source of heated water passing underneath the conveyor belt by a generally U-shaped water channel positioned underneath the conveyor belt. The bottom of the channel is randomly perforated permitting passage of water out of the channel to baste food product carried on a below positioned conveyor belt. The channel follows the entire path of the belt. Water at a preferred temperature of 200-205 degrees Fahrenheit is pumped upwardly from the water reservoir to a top portion of the water channel and flows downwardly within the channel while the conveyor carries the food product upwardly over the surface of the channel.

9 Claims, 1 Drawing Sheet

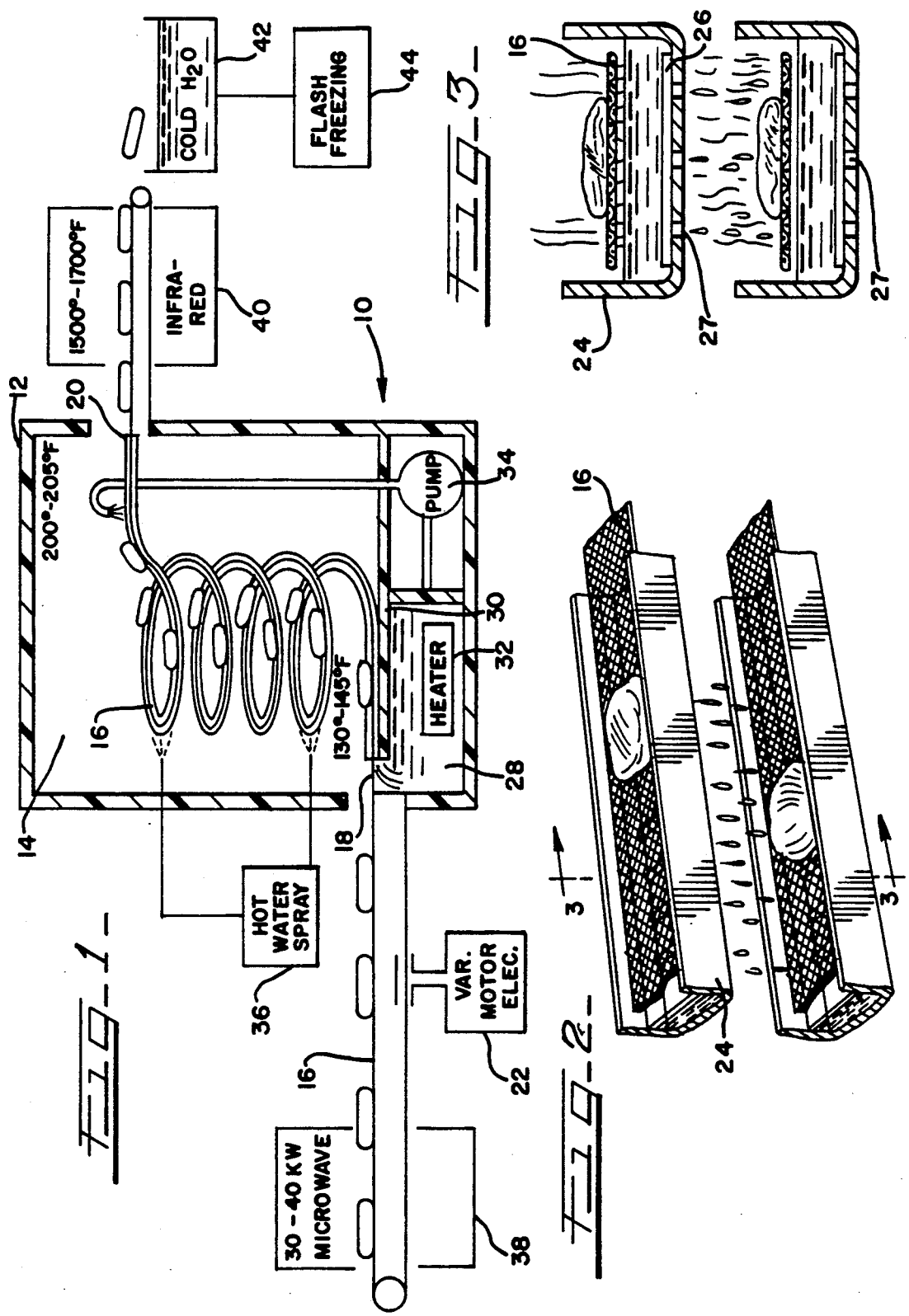

LOW TEMPERATURE SPIRAL CONDUCTION VAPOR COOKER AND PROCESS

TECHNICAL FIELD OF THE INVENTION

The present invention generally relates to conduction and vapor cooking and related cooking and pasteurization processes, and, in particular to a unique spiral conduction vapor cooker and food pasteurization process at relative low temperature and high speed for poultry, meat, and fish food products.

BACKGROUND OF THE INVENTION

The generally accepted time and temperature conditions which define when a food product is fully cooked is an internal temperature of the food product of at least 160 degrees Fahrenheit. Upon reaching this internal temperature, it has been determined that virtually all bacterial pathogens in the food product are rendered non-pathogenic. Because meat and poultry food products are predominantly water, if internal temperatures of food product of at least 160 degrees Fahrenheit are achieved rapidly such as through frying, broiling or grilling, moisture is driven from the food product. As a result, the food product is rendered dry, tasteless and generally unappealing. While raising the temperature of the food product slowly results in the lowest dissipation of moisture, such extended cooking is not possible in many restaurants, particularly fast food restaurants. Hence, processors of meat and poultry products, such as deboned chicken or ground beef meat patties, deliver such products to restaurants in frozen but precooked states. That is, the internal temperature of the product was raised to at least 160 degrees Fahrenheit at the food processing facility. Cooking time at a restaurant is therefore reduced as the frozen food product need only be thawed and warmed to a palatable temperature.

To effect gradual cooking of the food product to minimize water loss, food processors have utilized horizontally oriented linear cookers or vertically oriented spiral steam cookers. Spiral steam cookers are often preferred due to lesser floor space requirements. Because of their configuration, spiral steam cookers provide extended exposure of the food product to boiling water temperatures to gradually elevate internal temperatures of the food product. Examples of spiral steam cookers are seen in U.S. Pat. Nos. 4,363,263; 4,582,047 and 4,737,373. The steam temperature and thus the cooking chamber in such prior art spiral steam cookers is maintained at a constant, typically from at least 160 to about 212 degrees Fahrenheit.

A problem with these and other prior art spiral steam cookers and related cooking methods is the inability to reach a uniform internal product temperature and the extended time required for raising the internal temperature of the food product to the required temperature of 160-185 degrees Fahrenheit. Such extended cooking times prevents high rates of production of cooked food product.

In addition, where steam temperatures in prior art cookers are elevated, they are often too high to optimize the desirable moisture content of the food product and are not uniform throughout the cavity of the cooker. However, a reduction in steam temperature to maximize moisture content would further prolong cooking times.

Hence, prior to the present invention, a need existed for a spiral conduction vapor cooker and related cooking method which results in higher rates of heat transfer production of cooked food product yet utilizes reduced conduction and vapor temperatures to preserve the maximum moisture content of the food product by precise internal, equilibration temperature in the center of the product.

SUMMARY OF THE INVENTION

According to the present invention, a unique spiral conduction and water vapor cooker and food processing system has been developed which increases the speed of heat transfer into a flat or three-dimensional food product of protein origin while enhancing productivity of the cooking process. The system of the present invention achieves cooking at conduction and vapor temperatures greatly reduced from those practiced or known in the art. Generally, the spiral conduction vapor cooker of the present invention comprises an insulated housing defining a cooking chamber. The housing preferably includes a reservoir or sump containing electrical submerged heater means fluid connected to a centrifugal or permanent displacement pump. This permits the recirculation of a suitable liquid heat transfer medium, such as water, which is temperature controlled preferably by a proportionate electrical solid state control mechanism. This maintains the water within a precise equilibration temperature of $+1/-1$ degree Fahrenheit regardless of water flow rate or fluid pressure.

Rising within the cooking chamber is a vertically oriented spiral conveyor carrying a stainless steel mesh conveyor belt. Uncooked food product enters the cooking chamber at the bottom of the spiral conveyor and is conveyed upwardly to the top of the conveyor where the cooked food product is discharged from the cooking chamber.

Cooking to a precise equilibration internal product temperature is achieved by direct conduction of water vapor rising through the mesh conveyor belt from a downwardly flowing source of heated water passing underneath the conveyor belt. Specifically, a generally U-shaped water channel, having a partially perforated bottom, is positioned underneath the conveyor belt and follows the entire path of the belt. Water at a preferred temperature between 140–205 degrees Fahrenheit is pumped upwardly from the water reservoir to a top portion of the water channel. The water flows proportionately downwardly within the channel while the conveyor carries the food product upwardly above the surface of the water channel. At the bottom portion of the channel the water initially has a low temperature of about 130–145 degrees Fahrenheit and returns to the reservoir where it is reheated and filtered before it is recirculated to the top portion of the spiral water distributing means.

As discussed in greater detail below, the conduction of heat to the food product is also achieved by other means. The vapor cooking process of the present invention includes intermittent hot water jets which spray heated water onto the product carried on the conveyor belt. This heats both the food product and the mesh conveyor belt. The sprayed hot water may contain flavor enhancers, such as seasoning, salts or spices. Water running through the mesh conveyor belt is collected in the channel underneath the conveyor belt. The water vapor rising from the channel maintains the surface temperature of the conveyor belt. This causes the food product also to be thermalized by conduction from the heated conveyor belt.

The water collected within the channels from the hot water spray is continuously heated and recirculated underneath the conveyor. This recirculated water, already containing the flavor enhancers dissolved within the hot water spray, becomes further enriched as animal fat is rendered from the slowly cooking food product. This forms a cooking "brine" which can be used to baste the food product. Basting is achieved by the water trickling through the perforations on the bottom of the channel and onto the food product being carried on a conveyor belt below. Such basting further enhances flavor and organoleptic attributes of the food product. Toward the end of the conveying cycle, the internal food product temperature will equilibrate to an internal temperature identical to that of the sprayed water stream, the conveyor belt and the water vapor rising from the channel.

The downward flow of heated water through the channel, the basting process and the hot water spray create an increasing temperature gradient from the bottom to the top of the cooking chamber. Accounting for an approximate 10–15% loss of heat through thermal transfer, internal temperatures of food product ultimately reach a uniform equilibration temperature achieving precise internal product temperatures in accordance with specified temperature criteria, generally of at least 160–185 degrees Fahrenheit.

In another aspect of the conduction vapor cooking process of the present invention, the food product is preheated before entering the spiral conduction vapor cooker. Preferably, such preheating is achieved in a conveyorized microwave processor which elevates internal temperatures of the food product from 36–40 degrees to about 120–160 degrees Fahrenheit without appreciable heating of the surface portions within a time frame of about 4–8 minutes.

In a further aspect of the present invention, the cooked food product, after exiting the spiral vapor cooker, is momentarily exposed to high temperature infrared radiation and hot air impingement velocity. This process cosmetically finishes the food product to reduce fat and provide a pleasing charred appearance.

Another aspect of the conduction vapor cooking process of the present invention is precooling of the cooked food product in a cold water bath. Such precooling occurs before the cooked food product is frozen. Precooling achieves a gradual reduction in internal temperatures and when chilling temperatures of 34–40 degrees Fahrenheit are maintained, the food product absorbs water. This serves to partially replace whatever moisture was lost during vapor cooking and permits the cold water bath to be treated with flavor enhancers.

Other advantages and aspects of the invention will become apparent upon making reference to the specification, claims, and drawings to follow.

BRIEF DESCRIPTION OF DRAWINGS

FIG. 1 is a system schematic diagram of the spiral vapor cooker and other aspects of the process of the present invention;

FIG. 2 is a fragmentary perspective view of the conveyor belt and water channel utilized in the spiral cooker of the present invention; and, FIG. 3 is a vertical section taken along lines 3—3 of FIG. 2.

DETAILED DESCRIPTION OF THE INVENTION

While this invention is susceptible of embodiment in many different forms, there is shown in the drawings and will herein be described in detail a preferred embodiment of the invention. The present disclosure is to be considered as an exemplification of the principles of the invention and is not intended to limit the broad aspect of the invention to embodiment illustrated.

Referring now to the drawings, FIG. 1 diagrammatically discloses a spiral vapor cooker 10 of the present invention as well as the other steps of the cooking and food processing system of the present invention. This system is primarily based on vapor cooker 10 comprising an insulated housing 12 which defines a cooking chamber 14. Rising upwardly within chamber 14 is a conveyor belt 16 which upwardly conveys food product within chamber 14. Conveyor belt 16 has a circuitous, preferably spiral path, which lengthens the time exposure of uncooked food product to the various temperature and humidity conditions found within chamber 14. Each tier of the spiral should be spaced relatively close together for reasons to be explained later in greater detail. A lowermost portion 18 of conveyor 16 is adapted for receiving uncooked food product within chamber 14. Likewise, an uppermost portion 20 of conveyor 16 is adapted for discharging cooked food product from chamber 14. Conveyor 16 is driven by a variable speed motor 22 which enables the shortening or lengthening of cooking time.

Tracking underneath spiral conveyor 16 is a water channel 24 which preferably is co-extensive with the length of spiral conveyor 16 within chamber 14. As best disclosed in FIGS. 2 and 3, water channel 24 is an open U-shaped duct with a plurality of ribs 26 positioned along the bottom of channel 24. Also, channel 24 includes perforations 27 which may be randomly dispersed along the bottom of channel 24. The function of ribs 26 and perforations 27 will be described later in greater detail.

Cooker 10 further includes a reservoir 28 containing heated water. Reservoir 28 may be integral with housing 12 as shown in FIG. 1 or may comprise a tank or container separate from housing 12. Where reservoir 28 is integrated with housing 12, reservoir 28 must be separated from cooking chamber 14 by an insulating partition 30 as shown in FIG. 1. Partition 30 prevents water vapor rising from the heated water within reservoir 28 from interfering with the increasing temperature gradients which is an important aspect of the operation of cooker 10. Reservoir 28 is preferably equipped with an electrical heating means 32, a float valve and filtration system (not shown) and a thermostatically controlled water pump 34.

Pump 34 elevates the heated water from reservoir 28 to a portion of channel 24 which corresponds with the uppermost portion 20 of conveyor 16. The heated water being elevated to an upper portion of channel 24 preferably can have a temperature of up to 200–205 degrees Fahrenheit. Such temperatures may be deployed to impart a specified internal product temperature to the food product despite a 10–15% loss of heat due to thermal transfer between the conduction and water vapor heat transfer to the food product.

As food product is conveyed upwardly on spiral conveyor 16, the heated water flows downwardly within channel 24. As disclosed in FIGS. 2 and 3, water vapor rises from the downwardly traveling stream of water, passing through conveyor belt 16, which comprises a stainless steel mesh. Ribs 26 along the bottom of channel 24 contribute to enhanced turbulence of the downwardly flowing water to maximize the creation of water vapor. The temperature of the water at lowermost portion 18 of spiral conveyor 16 could reach about 130-150 degrees Fahrenheit at which point the now cooled water is returned to reservoir 28 for filtering and instant reheating. Hence, an increasing temperature gradient is created within chamber 14 such that the water vapor temperature at lowermost portion 18 of spiral 16 can reach 130-145 degrees Fahrenheit and gradually increases as a result of the downward flow of heated water underneath spiral 16. A maximum vapor temperature of 200-205 degrees Fahrenheit can be reached at about uppermost portion 20 of spiral 16. The gradual increasing temperature gradient within cooking chamber 14 minimizes loss of moisture in the food product being cooked and pasteurized. Such loss of moisture in the food product may be further minimized through use of a hot water spray 36 which is useful when production demands require the higher speed of conveying food product along spiral conveyor 16 within cooking chamber 14.

Cooker 10 of the present invention also achieves conduction cooking of food product carried on conveyor 16. In particular, spray 36 thermalizes both the food product carried on conveyor 16, and also heats the stainless steel mesh conveyor belt. Water used in hot water spray 36 may contain dissolved flavor enhancers such as seasonings, salts or spices. Water from hot water spray 36 both running off the food product and passing through the mesh conveyor belt, is collected within channel 24. This assures continued thermalization of conveyor 16 which creates conduction cooking of the food product from the now heated conveyor belt.

The water collected from hot water spray 36 within channel 24 is heated and recirculated so as to continuously be running underneath spiral conveyor 16. This recirculated water, which already contains the flavor enhancers found within the water for the hot water spray 36 becomes further enriched as animal fat is rendered from the food product cooking on the stainless steel mesh conveyor belt. Hence, the recirculated water develops into a cooking brine which is further used in the basting process of the present invention. Basting is achieved by the recirculated basting water trickling through perforations 27 which are formed into the bottom of channel 24. Such basting water trickles downwardly through the perforations 27 and onto the food product which is carried on a below positioned conveyor belt. Hence, basting water is raining continuously downward between each tier of the spiral conveyor 16. Thus, each tier of the spiral conveyor should be spaced closely together, such as 6 to 8 inches, to optimize the basting process.

As part of the process of the present invention, prior to entry of uncooked food product into cooker 10, the internal temperature of the food product should be elevated to 100-140 degrees Fahrenheit. This may be accomplished through use of a 40-120 kilowatt microwave processor 38. Within 60 to 240 seconds, the microwave processor 38 raises the internal temperature of the food product to the aforementioned temperature range. Upon entering cooker 10 at lowermost portion 18 of conveyor 16, the internal temperature of the food product closely matches the 130-145 degree Fahrenheit vapor temperatures. The internal temperature of the food product is then gradually raised as it is upwardly conveyed within chamber 14 until it reaches uppermost portion 20 of spiral conveyor 16. At this point, the food product is fully cooked and has an internal temperature of about 160-180 degrees Fahrenheit.

As part of the food processing system of the present invention, the cooked food product may then be cosmetically finished to provide a pleasing appearance. Such cosmetic finishing may include charring only the surface of the food product. Such charring may be accomplished by momentarily exposing the food product to a high temperature infrared radiation zone 40 having temperatures of 1500-1700 degrees Fahrenheit. Such high temperatures momentarily scorch the surface of the food product with a minimal loss of moisture content in the food product.

Another aspect of the process of the present invention is immersing the cosmetically finished and cooked food product into a cold water bath 42 which is maintained at chilling temperatures of between 34-40 degrees Fahrenheit. This gradually chills the food product and causes the food product to absorb both water and other flavor enhancers which may be dissolved in the cold water bath.

Finally, the process of the present invention also includes the step of flash freezing the completed cooked food product to preserve flavor and moisture content in the food product.

Through use of the process and unique low temperature of the high speed spiral vapor cooker of the present invention, very little moisture is driven from the food product during the cooking operation. As a result, low fat, or no fat meat and poultry products may be cooked and processed and yet result in a flavorful and moist end product. By minimizing the loss of moisture in the cooking process, fat may be virtually eliminated from meat and poultry products and substituted with vegetable or other moisture containing components.

While the specific embodiments have been illustrated and described, numerous modifications come to mind without significantly departing from the spirit of the invention and the scope of protection is only limited by the scope of the accompanying claims.

I claim:

1. A low temperature water conduction and vapor cooker for fish, meat and poultry products, comprising:
   a cooking chamber;
   a conveyor belt within the cooking chamber, the belt having a path rising circuitously within the cooking chamber such that generally each tier of the conveyor belt passes over another tier of the conveyor belt, a lowermost portion of the belt path being adapted for receiving uncooked food product in the cooking chamber, an uppermost portion of the belt path being adapted for discharging cooked food product form the cooking chamber;
   means for channeling heated water underneath the belt path, the channeling means also having a circuitous path following the belt path and located directly beneath each tier of the conveyor belt; and,
   a source of water heated to a temperature of no more than 205 degrees Fahrenheit; the source supplying heated water to the means for channeling near the uppermost portion of the belt path, the means for channeling being of sufficient length such that the heated water cools to about no less than 130 degrees Fahrenheit near the lowermost portion of the belt path.

2. The low temperature water conduction and vapor cooker of claim 1 wherein the conveyor belt permits passage of water vapor through the belt.

3. The low temperature water conduction and vapor cooker of claim 2 wherein the conveyor belt includes a stainless steel mesh belt.

4. The low temperature water conduction and vapor cooker of claim 1 further including means for returning the cooled water to the heated water source.

5. The low temperature water conduction and vapor cooker of claim 1 wherein the belt path includes a spiral belt path.

6. The low temperature water conduction and vapor cooker of claim 1 wherein the means for channeling heated water includes a U-shaped duct.

7. The low temperature water conduction and vapor cooker of claim 6 wherein the U-shaped duct includes ribs carried on a bottom inside surface of the duct and extending substantially the width of the duct.

8. The low temperature water conduction and vapor cooker of claim 6 wherein the bottom of the U-shaped duct is randomly perforated to permit heated water to trickle through and to baste food product carried on a below positioned portion of the conveyor belt.

9. The low temperature water conduction and vapor cooker of claim 1 further including means for spraying of heated water onto the uncooked food product being carried on the conveyor belt.

* * * * *